May 19, 1942.  A. M. WOLF  2,283,713
VEHICLE BRAKING SYSTEM
Original Filed April 15, 1933
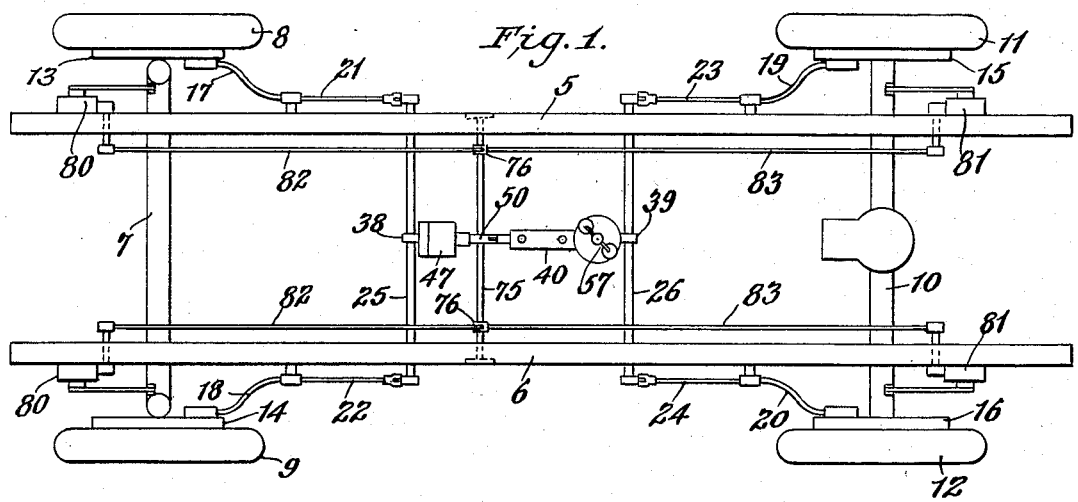
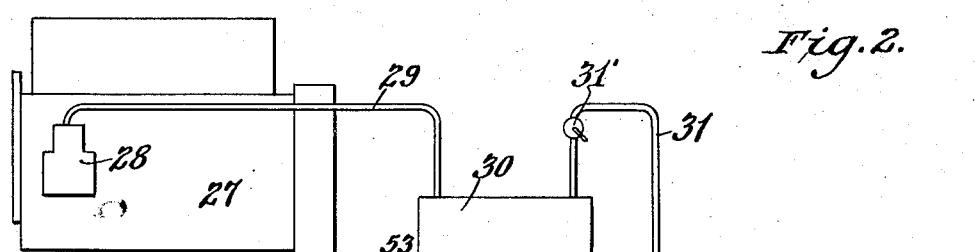
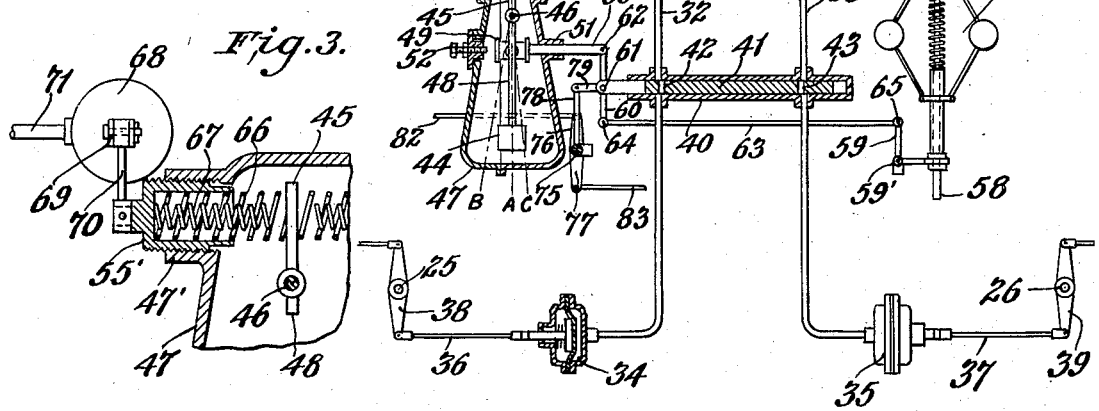
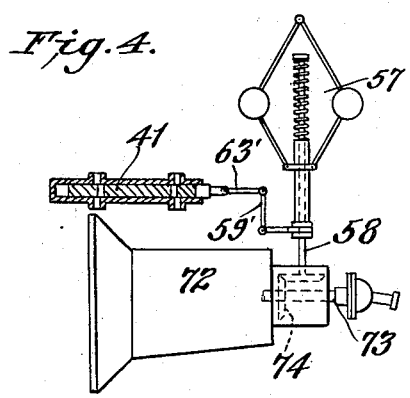
INVENTOR.
Austin M. Wolf,
BY M. C. Lyddane
ATTORNEY.

Patented May 19, 1942

2,283,713

UNITED STATES PATENT OFFICE 2,283,713

VEHICLE BRAKING SYSTEM

Austin M. Wolf, Plainfield, N. J.

Original application April 15, 1933, Serial No. 666,332. Divided and this application May 29, 1939, Serial No. 276,348

31 Claims. (Cl. 188—10)

This invention relates to vehicle braking systems having certain novel characteristics capable of practical application to either dirigible or rail-borne vehicles. The subject matter of the present application constitutes a division of my pending application for patent, filed April 15, 1933, Ser. No. 666,332, now Patent No. 2,181,161, November 28, 1939.

One of the principal objects of the invention is to provide a method and means for controlling vehicle brakes, embodying means, automatically responsive to brake application for regulating the braking system to control the rate of deceleration which is variable in accordance with changes or variations in the intensity of brake application.

More particularly, I provide a regulating means for vehicle braking systems which is responsive to the combined influence of multiple factors, co-existing at the moment of brake application, to control and modify the rate of deceleration. In one mechanical embodiment, these factors may comprise speed and inertia responsive means operatively connected with the regulating means for the braking system.

An additional object of the invention is to provide a movable inertia mass, responsive to either positive or negative acceleration of the vehicle, with adjustable means for controlling the movement of said inertia mass, and the consequent rate of deceleration.

The present invention provides a new method of control for vehicle braking systems, and in one embodiment thereof, I propose a coordinated control of both the suspension and braking systems of the vehicle whereby the rigidity of the suspension system and the intensity of braking pressure is modified in response to the combined influence of vehicle speed and deceleration at the moment of brake application.

It is also another important object of the invention to provide in connection with a brake applying means for front and rear sets of vehicle wheel brakes a device which will be sensitively responsive to grade inclination of the vehicle and which is connected with a part of the brake applying means to actuate the same and maintain an effective pressure on one set of brakes, independently of actuation of operator controlled means releasing the pressure on the other set of brakes.

A more specific object of the invention is to provide means for yieldably opposing movement of the inertia responsive element, with means for regulating and conditioning said yielding means automatically in accordance with the intensity of brake application, to apply a variable opposing force to the movement of the inertia element from its normal position.

A further specific object of the invention resides in the provision of a plurality of springs mounted and arranged so as to sequentially oppose the movement of said inertia responsive element.

With the above and other objects in view, the invention consists in the improved vehicle braking system, and in the form, construction and relative arrangement of the various parts thereof as will be hereinafter more fully described, illustrated in the accompanying drawing and subsequently incorporated in the subjoined claims.

Referring in detail to the drawing in which I have disclosed a particular mechanical embodiment of the invention and in which similar reference characters designate corresponding parts throughout the several views:

Fig. 1 is a plan view of a vehicle frame or chassis having the present invention applied thereto.

Fig. 2 is a semi-diagrammatic side elevation with parts shown in section, illustrating the invention as applied to a fluid pressure operated braking system and utilizing inertia and speed responsive means for controlling the braking pressure.

Fig. 3 is an enlarged detail section of a modification of the control means for the inertia responsive element, and Fig. 4 is a detail view showing the pressure regulating or modulating valve operatively controlled only by speed responsive means.

For purposes of illustration I have shown an automotive vehicle frame or chassis having the longitudinal side rails 5 and 6 respectively, a front axle 7 with the wheels 8 and 9 and a rear axle 10 with its wheels 11 and 12. The brake drums indicated at 13, 14, 15 and 16 are secured to the respective wheels in the usual manner and conventional braking mechanism is mounted within these drums. In the present instance, this mechanism is mechanically actuated through the flexible connections 17, 18, 19 and 20 respectively, though it will be understood that such connections may also supply pressure fluid to brake actuating cylinders mounted within the wheel drums. In the mechanically operated type as herein shown, rods 21, 22, 23 and 24 actuate flexible cables within the connections 17, 18, 19 and 20 respectively. The rods 21 and 22 are operatively connected with lever arms on the ends of a front cross-shaft 25 and the rods 23 and 24 are similarly connected with lever arms on the ends of a rear cross-shaft 26, said shafts being journalled in suitable bearings mounted on the side rails 5 and 6 of the frame.

While I have shown a four-wheeled vehicle, it will be apparent as the description proceeds, that the invention is applicable as well to, railway or other multiple wheeled vehicles. Should two or more rear axles be used, the cross-shaft 26 will apply the initial pull on the braking mechanisms of the rear wheels. Similarly, when two or more front axles are used shaft 25 applies the initial pull to the front braking mechanisms. Also, of course, independent wheel suspension may be employed without affecting the operation of the invention.

In Fig. 2 of the drawing, I have diagrammatically illustrated the engine or prime mover 27 provided with an air-compressor 28 connected by pipe 29 with a storage tank or reservoir 30. The pipe line 31 connected with said reservoir has a control valve 31' located therein, operated, through suitable connections (not shown) by a hand or foot actuated member of conventional form.

The pipe line 31 supplies fluid under pressure from reservoir 30 to the branch pipe lines 32 and 33 respectively, said branch lines in turn supplying the pressure fluid to the cylinders or diaphragm units 34 and 35 respectively, which actuate link rods 36 and 37 connected with arms 38 and 39 on the cross-shafts 25 and 26 respectively. In place of the cross-shafts 25 and 26 and actuating connections with the brake mechanisms, cylinders 34 and 35 can be mounted, singly or in pairs, on the vehicle axles with the customary flexible connections between the axles and the frame, with direct fluid supply connections between said cylinders and the brake applying cylinders within the wheel drums.

As above described, the brake operation is in accordance with current practise. However, I propose to interpose in the branch fluid supply lines 32 and 33 a modulating or regulating mechanism for the purpose of controlling the application of braking pressure on the individual vehicle wheels and also proportionately regulating the distribution of fluid braking pressure between the front and rear wheels of the vehicle. In one embodiment of the control mechanism the branch pipes 32 and 33 are connected by a casing or housing 40. Within this casing the valve 41 is longitudinally slidable and is provided with ports or apertures 42 and 43 respectively, located near the opposite ends of said valve. The distance between these ports or apertures is less than the distance between the branch pipes 32 and 33 so that in all positions of the slide valve said ports will be out of alignment or in staggered relation to the pipe connections 32 and 33 with the casing 40. As shown, in the normal position of said slide valve, the ports 42 and 43 have an equal area communicating with the respective branch pipes 32 and 33 so that when valve 31' is actuated, brake operating fluid of equal volume and pressure is applied to each of the cylinders 34 and 35.

Of course, this initial fluid pressure supply whereby the brakes are first actuated, may be sensitively controlled by the operator in the actuation of valve 31'. When traveling at low speed, valve 41 may remain substantially in its normal position while the brakes are applied with sufficient intensity to completely stop or arrest movement of the vehicle.

However, it is well known that when the vehicle is moving at reasonably high speed, and the brakes are suddenly applied, equal distribution of the braking effort between the front and rear wheels does not give satisfactory performance. In order to compensate for the shifting of the weight of the vehicle body with an increasing proportion on the front wheels during negative acceleration, it is recognized, in current practise, that greater braking effort should be applied to the front wheels than to the rear wheels. However, with increasing speeds, this proportional distribution should vary in order to obtain the most efficient braking action and bring the vehicle quickly and smoothly to a stop at such high speeds. Therefore, I have provided means for automatically varying this distribution of the braking pressures between the front and rear wheels in response to deceleration, which of course, varies in effect with variation in vehicle speed and the intensity of initial brake application.

In my present invention, this desirable automatic control is obtained by the use of a movable inertia responsive mass 44 connected with a rockable arm or member 45 fulcrumed as at 46, within the housing or casing 47. This connection between mass 44 and the arm 45, in the present instance, comprises a rod 48. Intermediate of its ends this rod is pivotally connected with a sleeve 49 on one end of a rod 50 slidably mounted in a suitable bearing 51 on the wall of the housing 47. On the opposite wall of said housing an adjustable stop 52 is suitable mounted to be engaged by the end of sleeve 49, whereby swinging movement of the inertia responsive mass 44 and rocking movement of arm 45, may be variably and positively limited.

The inertia mass 44 and arm 45 are yieldingly held in a normal centered position within the casing 47 by means of the springs 53 and 54, respectively mounted in cup members 55 and 56 which are removably threaded in bosses or extensions formed on the opposite walls of the casing 47.

In addition to the above described inertia responsive means for controlling the operation of the regulating valve 41, I also provide a speed responsive means concurrently operable with the inertia means to modify the regulatory effect of the latter. This speed responsive means may consist of a conventional type centrifugal governor 57 driven by shaft 58 and which actuates the bell-crank lever 59 having a fixed pivot at 59'.

To the end of slide valve 41 projecting from casing 40, a vertically disposed equalizer bar 60 is pivoted intermediate of its ends as at 61. This bar at its upper end is pivotally connected as at 62, with the slidable rod 50 actuated by the inertia reesponsive mass 44. A link 63 has one of its ends pivotally connected at 64 with the lower end of the equalizer bar 60 while the other end of said link is pivotally connected as at 65 with one arm of the bell-crank lever 59.

Assuming now that the vehicle is traveling at high speed and that the operator actuates valve 31' to apply the brakes, the initial intensity of the brake application by the distribution of equal fluid pressures to the front and rear brakes is, of course, dependent upon the extent or degree of opening movement of the valve 31'. Upon the initiation of braking torque reaction on the wheels resulting in deceleration of vehicle speed, the inertia mass 44 leaves its central position indicated by the line A, and assumes a position substantially as indicated, for instance, by the line B. Dependent upon the severity of the braking torque reaction, this swinging movement of the inertia mass against the opposed resistance of spring 54 may continue until the sleeve 49 strikes the adjustable stop member 52. This movement of the inertia responsive element is transmitted through the connected rod 50 and bar 60 to the slide valve 41, said valve being moved towards the left from its illustrated position to place port 42 thereof in increasing alignment with the branch fluid supply pipe 32 and at the same time effect an increasing misalignment or cut off in the fluid supply connection between port 43 and branch line 33 to the rear wheel brakes. Therefore, due to this variation in the effective areas between ports 42 and 43 and branch lines 32 and 33 respectively, a greater amount of pressure fluid will be supplied to the actuating cylinder for the front brakes. As the brakes are initially applied by the manual operation of valve 31' with more or less intensity, the inertia mass 44 will correspondingly and progressively move in the forward direction indicated by line B, until it reaches a stable position, such position, and therefore, the positions of the ports in valve 41 with respect to pipe lines 32 and 33, being determined by the extent or degree of braking torque reaction and the initial deceleration effect consequent thereon. Of course, any change in the intensity of braking pressure, effected by adjustment of the valve 31', will necessarily result in a variation in the rate of deceleration. As the vehicle slows up, the inertia mass 44 will swing back towards its normal or central position and finally assume the position indicated by the line A, at very low speed and when the vehicle is at rest.

The influence of this inertia responsive device upon the position of the regulating or modulating valve 41 will be modified by the conjoint action of the speed responsive means. It is obvious that at high driving speed the centrifugal governor 57, operates through the link connection 63 with the equalizer bar 60 to shift the valve 41 to the left, independently of any movement of the inertia influenced mass 44. Thus either increase in vehicle speed or in inertia effect will result in the above described operation of the regulating valve 41, and in which either of these controlling influences upon the operation of the regulating valve is automatically compensated for by the equalizer 60.

The valve ports 42 and 43 may be of any selected size and cross-sectional shape to obtain a desired predetermined graduated control of the fluid braking pressures.

By making the springs 53 and 54 very flexible, the apparatus can be made sensitively responsive to grade inclination, as when the vehicle is ascending or descending a hill. Assuming that the vehicle is moving on an ascending grade, the inertia mass 44 will assume approximately the position indicated by the line C, resulting in a movement of the control valve 41 to the right or rearwardly whereby the brake applying cylinder 35 will receive the pressure fluid in increasing volume upon actuation of the valve 31'. Of course this operation of the valve 41 would also be modified in accordance with the speed of movement of the vehicle, the speed responsive device through the equalizer bar connection tending to move the valve 41 toward the left. Therefore if the speed of movement of the vehicle on the up-grade increases, there is a progressively increasing movement of the valve 41 towards its normal position, notwithstanding the action of the inertia responsive device. Also, should the vehicle move backwards at an excessive rate of speed, the inertia responsive mass 44 will swing to the position C and thus produce a greater braking effort on the rear wheel brakes. This would be very desirable on heavy buses or trucks.

On approaching a descending grade, valve 31' is operated to provide approximately equal pressures on both the front and rear brakes. When inertia weight 44 moves to position B and shifts control valve 41, the supply of pressure fluid to the rear cylinders 35 is cut off, while the supply to the front cylinders 34 is increased. If it becomes necessary to park the vehicle on the grade, the pressure on the rear brakes will thus be maintained after the operator's control valve 31' returns to normal position so that the connections with the front brake cylinders 34 are vented through said valve.

In order to make the means which yieldingly resists the operation of the inertia responsive device progressively variable in proportionate ratio with variation in the intensity of brake application, I provide the arrangement shown in Fig. 3 of the drawing. Thus, instead of the single spring opposing movement of the rocker arm 45 in each direction, I provide an outer relatively flexible spring 66 of large diameter and an inner comparatively stiff and shorter spring 67. These springs at their outer ends are suitably attached to the base wall of the cup member 55' which has a quick acting external thread engaged with the internal thread of the boss 47' on the wall of the housing 47. The inner end of the longer spring 66 is at all times in bearing engagement against one side of the rocker arm 45 while the corresponding end of the shorter inner spring 67 is out of contact with and spaced from said arm when in its normal position. It will thus be understood that this dual spring arrangement results in the sequential application of yieldable opposing pressures by the respective springs to the swinging movement of the inertia operated rocker arm 45. Of course it is evident that this yielding resistance to the movement of the arm progressively increases with increase in the inertia force.

However, I also provide means for automatically conditioning said springs whereby such progressive increase in the opposing stresses of said springs may be regulated or varied in accordance with variations in the intensity of brake application. To this end, I employ a suitable motor means for adjusting the threaded cup 55' relative to the center line of the housing 47. As herein shown, this motor means comprises a suitable cylinder indicated at 68, having a piston or diaphragm operating therein, suitably connected as at 69 with a rod or lever 70 connected to the outer end of the cup 55'. The cylinder 68 is supplied with pressure fluid through pipe 71 connected with the fluid pressure supply pipe 31 between valve 31' and the branch pipe lines 32 and 33. It is thus apparent that if the valve 31' is opened and pressure established in the line 31, such fluid pressure will also be supplied to cylinder 68, thereby actuating lever 70 and rotating the cup 55' to move the same inwardly and thereby cause the sequentially acting springs 66 and 67 to apply an increased opposing resistance to the swinging movement of the rocker arm 45, and accordingly to the sliding movement of valve 41. Thus in proportion to the increase of pressure in pipe line 31 and the intensity of brake application, the opposing resistance to the action of the inertia device and movement of valve 41 is also increased. The rate of deceleration is thus controlled and varied so that in the operation of the braking system, even at very high traveling speeds, the vehicle will be quickly and smoothly brought to a stop. It is of course, understood that the arrangement of the springs 66 and 67 and the automatic regulating or adjusting means therefor is duplicated at the opposite side of the housing 47 as indicated by Fig. 2 of the drawing.

Power may be transmitted by any suitable means to shaft 58 for the operation of governor 57 and in Fig. 4 of the drawing I have shown said governor arranged at the rear of transmission unit 72, the shaft 58 being driven from the universal joint shaft 73 by the conventional bevel gears 74. In this view, I have shown the slide valve 41 for the control or regulation of the braking pressures actuated through bell-crank lever 59' and connecting link 63', only in response to the operation of the centrifugal governor.

In Figs. 1 and 2 of the drawing, I also show the vehicle suspension system coordinated with the braking system for simultaneous regulation and control by the inertia and speed responsive means above described. Thus the cross-shaft 75 is suitably journaled at its opposite ends upon the side rails 5 and 6 of the vehicle frame and adjacent each of said ends is provided with upwardly and downwardly extending arms, indicated at 76 and 77 respectively. This shaft, at its approximate center is further provided with the upwardly extending arm 78 pivotally connected with a longitudinal extension 79 on one end of the slide valve 41.

Upon opposite ends and at opposite sides of the vehicle frame, the front and rear shock absorbers 80 and 81 are suitably mounted. These shock absorbers may be of any desired conventional type and are each provided with a suitable control valve for the shock absorbing liquid. These valves are actuated and adjusted through the rod connections 82 between the valves of the front shock absorber and the arms 76 on shaft 75 and the similar rod connections 83 between the rear shock absorbers and the arms 77 on said shaft. It will thus be apparent that as the braking pressure is automatically controlled and varied in the manner above explained, the action of the shock absorbers to yieldingly resist movement of the vehicle body relative to the wheel axles will be correspondingly regulated or varied.

From the foregoing description, the construction, manner of operation and numerous advantages of my improved vehicle braking system will be clearly and fully understood. It will be seen that such a mechanism will be efficiently and accurately responsive in its operation and will automatically govern and control the differential application of the brakes to the best advantage, and as required in order to nullify the undesirable effects of a plurality of variable factors incident to the operation of the vehicle, and over which the operator has no control.

I have herein referred to the use of compressed air as the power medium for operating the brakes. It will however, be apparent that by the substitution of equivalent mechanical units well known in the art the characteristic features of my present disclosure are applicable as well to hydraulic or vacuum operated brakes. Further, although I have disclosed my invention as applied to an automotive road vehicle, it is self-evident that the same may also be utilized to advantage in connection with the braking system of rail-borne vehicles. Likewise, in such case, the proper equivalent mechanical units commonly used in this art would be substituted for the corresponding features of my present disclosure.

Therefore, it is accordingly to be understood that in the further practical development of my present invention and in its application to various types of vehicles, I do not consider myself as limited to the particular mechanical embodiment of the apparatus herein illustrated, but reserve the privilege of adopting other structural forms of the several mechanical units as well as variations in the relative arrangement of such units, as may fairly be considered as incorporated within the spirit and scope of the appended claims.

I claim:

1. In combination with vehicle braking means and a brake pressure regulating member therefor; independently operable devices directly coacting with said regulating member and jointly responsive to the combined influence of brake application and vehicle speed, to control the operation of said regulating member.

2. In combination with vehicle braking means and a brake pressure regulating member therefor; a combined speed and inertia responsive means connected with and controlling the operation of said regulating member.

3. In combination with vehicle braking means and a single brake pressure regulating means therefor; controlling means connected with said regulating means, comprising an inertia device responsive to vehicle deceleration and a device responsive to vehicle speed, said devices conjointly and independently actuating said regulating means.

4. In combination with regulable device for vehicle braking systems, means automatically responsive to vehicle deceleration connected to regulate said device, and means responsive to vehicle speed connected to regulate said device independently of said first named regulating means.

5. In a wheeled vehicle having a chassis supported for movement relative to the vehicle wheels; brake mechanism, means for variably regulating the braking force of said mechanism, means operatively connected with said regulating means and responsive to relative displacement between the vehicle chassis and wheels, and means responsive to vehicle speed controlling the effect of the operation of said last named means.

6. The combination of regulable braking means for a vehicle, and controlling means therefor comprising an inertia device responsive to vehicle deceleration connected to regulate said braking means, and a device responsive to vehicle speed connected to modify the regulatory effect of said inertia device.

7. In combination with regulating means for a vehicle braking system, a movable inertia mass operatively connected with said regulating means, yielding means resisting movement of the inertia mass, and means operatively connected in the braking system for varying the resistance offered by said yielding means in accordance with the intensity of brake application.

8. In combination with regulating means for a fluid operated braking system, a movable inertia mass operatively connected with said regulating means, yieldable means resisting movement of said mass from its normal position, and fluid operated means for varying the resistance of said yieldable means to such movement.

9. In combination with a vehicle braking system, a retardation controller device having an element movable according to the rate of retardation of the vehicle, yielding means for opposing movement of said element, regulating means for conditioning said yielding means to oppose movement of said element with variable forces, and means connected with and operatively controlling said regulating means.

10. In combination with a vehicle braking system, a retardation controller device having an element movable according to the rate of retardation of the vehicle, yielding means for opposing movement of said element, regulating means for conditioning said yielding means to oppose movement of said element with variable forces, and means automatically responsive upon operation of the vehicle braking system, to operatively control said regulating means.

11. In combination with a fluid operated vehicle braking system, a retardation controller device having an element movable according to the rate of retardation of the vehicle, yielding means for opposing movement of said element, regulating means for conditioning said yielding means to oppose movement of said element with variable forces, and means responsive to the influence of fluid pressure in the braking system to operatively control said regulating means.

12. An inertia control for brakes comprising a movable inertia mass, brake controlling means operable by motion thereof, and means for applying a variably yielding resistance to movement of the inertia mass in proportionate ratio to variation in the intensity of brake application.

13. An inertia control for brakes comprising a movable inertia mass; brake controlling means operable by motion thereof; yielding means resisting such motion; and means responsive to the intensity of brake application for varying the resistance offered by said yielding means.

14. The method of controlling vehicle brakes, which comprises regulating the intensity of brake application in response to the initial deceleration produced by such application, to change the rate of deceleration; and modifying such deceleration rate in response to change of the intensity of brake application.

15. The method of controlling the operation of a vehicle braking system having brake pressure regulating means, which consists in controlling the operation of said regulating means by force generated by movement of the vehicle, and modifying the effective effort of such force to actuate said regulating means, in response to variation in the intensity of brake application.

16. The method of controlling the operation of vehicle brakes, which consists in controlling the operation of the braking system by inertia forces incident to deceleration resulting from brake application, and modifying the effective controlling effort of such inertia forces in proportionate ratio to changes in the intensity of brake application.

17. The method of controlling the operation of vehicle brakes which comprises controlling the operation of vehicle brakes in response to the deceleration produced by said application, and modifying the effect of such response in accordance with vehicle speed to change the rate of deceleration.

18. The method of controlling the operation of vehicle brakes which comprises regulating the intensity of brake application independently of volitional operator control and in response to the deceleration produced by such brake application, and modifying such response in accordance with variation of the operator controlled intensity of brake application.

19. The method of controlling the deceleration of the vehicle in response to brake application, which consists in controlling the operation of the braking system by inertia forces incident to deceleration, and modifying the effective effort of such inertia forces, upon variation in the intensity of brake application, to correspondingly vary the rate of deceleration.

20. In a vehicle braking system, in combination, a communication through which fluid under pressure is supplied to effect an application of the brakes, a retardation controller device for controlling said communication, speed controlled means for also independently controlling said communication, and means responsive to change of the intensity of brake application to modify effective control of said communication by the controller device.

21. The method of controlling the operation of vehicle suspension and braking systems which consists in simultaneously modifying the rigidity of the suspension system and the intensity of braking pressure in response to the combined influence of vehicle speed and deceleration at the moment of brake application.

22. In combination with a vehicle suspension system having modifying means and a braking system having brake pressure regulating means; means responsive to the combined influence of the inertia effect of deceleration and to vehicle speed at the moment of brake application to actuate said brake pressure regulating means and said modifying means of the suspension system.

23. In combination with a vehicle having braking means and a fluid shock absorber having resistance regulating means; means responsive to the combined influence of vehicle speed and the inertia effect of deceleration at the moment of brake application to actuate said resistance regulating means and modify the resistance of the shock absorber.

24. In combination with a fluid pressure braking system for vehicles having front and rear sets of brakes, a source of fluid pressure, and operator controlled brake applying means between said pressure source and each set of brakes; and means automatically responsive to grade inclination of the vehicle from the horizontal and cooperating with a part of said brake applying means to maintain effective pressure on one set of brakes, independently of operator control of pressure on the other set of brakes.

25. In combination with a fluid pressure braking system for vehicles having front and rear sets of brakes, a source of fluid pressure, and operator controlled brake applying means between said pressure source and each set of brakes; means automatically responsive to grade inclination of the vehicle from the horizontal and cooperating with a part of said brake applying means to maintain effective pressure on the rear set of brakes independently of the operator controlled pressure supply to the front set of brakes.

26. In control means for vehicle brakes, a movable control member, resilient means normally resisting movement of said member from one position, and fluid pressure responsive means for conditioning said resilient means to variably oppose movement of said member to a second position.

27. In a vehicle braking system, a movable brake pressure control member, an inertia device operatively connected therewith to actuate the same upon deceleration of the vehicle, and means responsive to the intensity of braking pressure to modify the effective influence of the inertia device upon said control member.

28. In fluid pressure braking apparatus for a vehicle, a plurality of sets of brakes, means for actuating the brakes and comprising a source of pressure, a fluid motor associated with each brake and conduit means for connecting said motors to the source of pressure, normally open valve means associated with the conduit means leading to the fluid motors of one set of brakes, and momentum-actuated means automatically operating to close said valve means when the rate of deceleration of the vehicle reaches a predetermined value, said valve means when closed maintaining the existing fluid pressure in the fluid motors of said set of brakes and preventing additional pressure to be applied thereto.

29. In fluid pressure braking apparatus for a vehicle, front and rear brakes, means for actuating the brakes and comprising a source of pressure, a fluid motor associated with each brake and conduit means for connecting said motors to the source of pressure, normally open valve means associated with the conduit means leading to the fluid motors of the rear brakes, and momentum-actuated means automatically operating to close said valve means when the rate of deceleration of the vehicle reaches a predetermined value, said valve means when closed maintaining the existing fluid pressure in the fluid motors of the rear brakes and preventing additional pressure to be applied thereto.

30. In fluid pressure braking apparatus for a vehicle, a plurality of sets of brakes, means for actuating the brakes and comprising a source of pressure, a fluid motor associated with each brake and conduit means for connecting said motors to the source of pressure, and valve means associated with the conduit means leading to the fluid motors of one set of brakes, said valve means comprising a member normally maintained in valve open position by the action of gravity but moved to a valve closed position by the action of inertia during deceleration of the vehicle at a predetermined rate, said valve when closed maintaining the existing fluid pressure in the fluid motors of said one set of brakes and preventing additional pressure to be applied thereto.

31. In combination with a vehicle having brake control means, a speed responsive device, and a fluid shock absorber having resistance regulating means; means co-operatively connecting said resistance regulating means with the brake control means and speed responsive device and operatively responsive to an effective operation of said brake control means and to vehicle speed to actuate said regulating means and modify the resistance of the shock absorber.

AUSTIN M. WOLF.